United States Patent [19]

Andreae et al.

[11] Patent Number: 5,525,040

[45] Date of Patent: Jun. 11, 1996

[54] CONTROLLER FOR OIL WELLS WITH A THERMAL DISPERSION PROBE

[75] Inventors: Peter R. Andreae; Mark A. Nowicki; Timothy M. Lownie, all of London; Stuart F. Bevan, Glencoe, all of Canada

[73] Assignee: B&B Financial Planning Inc., Glencoe, Canada

[21] Appl. No.: 221,105

[22] Filed: Mar. 31, 1994

[51] Int. Cl.[6] ............................................. I04B 49/10
[52] U.S. Cl. ............................ 417/32; 417/12; 417/43; 417/53; 73/204.11
[58] Field of Search .................. 417/12, 32, 43, 417/53; 73/204.11, 204.15, 204.22, 204.25, 861.65

[56] References Cited

U.S. PATENT DOCUMENTS

| | | |
|---|---|---|
| 3,936,231 | 2/1976 | Douglas . |
| 4,171,642 | 10/1976 | Taylor . |
| 4,392,782 | 7/1983 | Kuehn, III et al. . |
| 4,911,009 | 3/1990 | Maeda et al. ............... 73/204.11 |
| 4,969,357 | 11/1990 | Mickler ....................... 73/204.11 |
| 5,080,106 | 1/1992 | Sekii et al. . |
| 5,222,867 | 6/1993 | Walker, Sr. et al. ............... 417/12 |

FOREIGN PATENT DOCUMENTS

| | | | |
|---|---|---|---|
| 92/16848 | 10/1992 | Australia ............... 73/204.11 | |
| 1043124 | 11/1978 | Canada . | |
| 1044037 | 12/1978 | Canada . | |
| 2047735 | 3/1990 | Canada . | |
| 2011439 | 3/1990 | Canada . | |
| 2018272 | 6/1990 | Canada . | |
| 0440155 | 8/1991 | European Pat. Off. . | |
| 0307315 | 12/1988 | Japan ....................... 73/204.11 |
| 402110322A | 4/1990 | Japan ....................... 73/204.11 |

*Primary Examiner*—Richard A. Bertsch
*Assistant Examiner*—Xuan M. Thai
*Attorney, Agent, or Firm*—Killworth, Gottman, Hagan & Schaeff

[57] ABSTRACT

A controller for controlling the pumping unit for an oil well comprises a housing having a first and a second tip for placement in a flow of oil between the wellbore to holding tanks; means for generating a substantially constant power; a constant power heater in the first tip connected to the means for generating, for radiating a substantially constant heat; means for determining the temperature at each the first and second tips and for generating a digital signal indicative of the temperature of the first and second tips; supervising means for controlling the means for determining, processing the digital signal for determining a rolling average signal, and generating a control signal therefrom which is independent of ambient temperature of the oil flow; and means for switching the pumping unit on or off, according to the control signal. The controller further comprises means for calibrating the means for determining. The constant power heater is preferably a FET connected in series with a resistor. The invention also provides a optimizing method for controlling a pumping unit of an oil well.

29 Claims, 9 Drawing Sheets

CONTROLLER FOR OIL WELLS WITH A THERMAL DISPERSION PROBE

BACKGROUND OF THE INVENTION

1. Field of the Invention

The present invention relates to a controller for oil wells and a method for determining the presence of oil in the well and accordingly controlling the pumping operation. In particular, the present invention is directed to a thermal dispersion probe for detecting the flow rate of oil extracted with an oil pump jack and related controller for regulating the pump starting and stopping based on measurements given by the probe.

2. Description of Related Art

In oil-well pump recovery operations, strategically anchored pumping jacks lift oil in discrete quantities to the surface through an originating underground well-pocket. These pumping jacks are powered by either electrical or natural gas motors, and the fluid produced consists generally of a mixture of crude oil, natural gas, dirt, wax, grit, and water. Upon reaching the surface, this combination is passed on to a separation system where oil in the fluid is released and temporarily stored.

Based on geological formation and well-type, the maximum attainable production rate depends on the migration of crude oil from underground porous rock and sand into the well-pocket. Typically, in mature wells, the capacity of the oil pumping jack exceeds the capacity of the surrounding formation to refill the well-pocket. Hence, there exists a requirement, especially for older wells, to control pumping action in response to changing rates of oil flow to the surface. For example, pumping action exceeding proportional oil recovery capacity can lead to severe pipe and pump jack degradation, while promoting surplus energy consumption exceeding required cost.

Many approaches to circumvent these problems have been proposed, all generally based on establishing correlations between the rate of oil flow and the pump jack operation. However, the search for an adequate solution has proven historically difficult.

For example, timers designed to allow pumping action for selected lengths of time have been installed at well sites. Periods are then adjusted in an attempt to match the flow characteristics of the well. However, while conceptually simple, the approach can neither accommodate the typical wide variations in oil production on a daily basis nor adjust itself to longer term changes in declining wells.

In general, oil-well pump control instrumentation may be classified according to the techniques used to signal change in fluid production. The most common include: flow ram change detection, polished rod load, motor torque or vibration sensing, and bottom hold pressure detection.

In flow rate change detection, sensing elements placed into the flow line signal reductions in fluid production over assigned timing intervals. If production falls below a given threshold during successive intervals pump jack operation is halted. The sensor is calibrated to sense the reduction in pumping rate over a preselected period of time.

For example, a sensor describing a mechanically actuated switch is disclosed in U.S. Pat. No. 3,936,231 (Douglas) issued Feb. 3, 1976. Here, oil emerging from the well is directed through a valve assembly. Whenever pumping action causes fluid to surge, the valve, activated in response, closes a magnetic switch thereby acknowledging that oil is present.

A problem inherent for these types of sensors is that unrefined oil pumped to the surface normally contains impurities such as dirt and sand, plus dissolved gas. Approaches based on mechanical designs (for example, paddle wheels) to measure the flow tend to become susceptible to expanding gas, leading to skewed flow results, while impurities in the oil over time tend to clog moving parts.

Other types of sensors have been based upon the properties of thermal dispersion. Such sensors use a heater and temperature measuring devices as for example, thermistors. European Patent Application 440155 A2 (Kufio et al.), published Jan. 29, 1992; and U.S. Pat. No. 4,392,782 (Kuehn et al.) issued Jul. 12, 1983 disclose such sensors. Generally, the heater embodies a heated resistive coil, as shown in Canadian Patent No. 1,044,037 (Schopp) issued Dec. 12, 1978, and Canadian Patent Applications No. 2,047,735 (Grimson et al.) published Aug. 19, 1990 and No. 2,018,272 (Micker) published Dec. 8, 1990. Alternative heat sources are also used, as microwave radiation (Canadian Patent Application No. 2,011,439 (Goldberg) published Sep. 6, 1990), and transistors (Canadian Patent No. 1,043,124 (Olmstead) issued on Nov. 28, 1978).

However, in order to obtain a reliable and accurate measurement, the power dissipation of the heating source should be maintained constant. A constant power dissipation is obtained with a constant power level applied to the heating element.

Another important property of the oil flow controller is that expanding gas flowing over the thermistors tends to not signal higher flow rates (as compared to paddle-wheel and other mechanical approaches) due to the lower density of the gas in comparison to oil.

SUMMARY OF THE INVENTION

It is an object of the present invention to provide an oil well with a controller having a thermal dispersion probe, which gives dependable measurements of the oil flow.

It is another object of the present invention to provide a controller which stops the operation of the pumping unit of the well based on on-line measurement of the oil flow, rather than counting how many times the presence of fluid in the wellbore is detected.

It is yet another object of the present invention to provide a controller which automatically adjusts the shutdown time for pumping operation.

Still another object of the invention is to provide a controller which is easy to manipulate and which may be readily set for various wells having various flow characteristics.

The controller and the method for controlling the pumping unit of an oil well according to the present invention are based on thermal dispersion. The controller is provided with a pair of thermistors. The thermistors are placed each in a tip of a steel housing, one tip also including a heater. The housing also incorporates the accompanying hardware and software. As oil emerges from the well head, it flows to the holding tanks through a piping arrangement into which the controller is plugged. As oil passes over the controller, both the cool probe with the first thermistor, and the warm probe with the second thermistor and the heater, measure the temperature of the oil. The higher the flow rate of oil passed over the probes, the more heat is carried away by the moving fluid and the lower the temperature recorded at the tips. Conversely, the slower the flow of oil, the less heat is carried away by the fluid; hence, the higher the temperature that is recorded. In this way, the governing principle involves the heat dissipation versus rate of flow.

Accordingly, the present invention provides a controller for controlling the pumping unit for an oil well, comprising: a housing having a first and a second tip for placement in a flow of oil between the wellbore and the holding tanks; means for generating a substantially constant power; a constant power heater in said first tip for receiving the constant power generated by said means for generating, and for radiating a substantially constant heat; means for determining the temperature at each of said first and second tips and for generating a digital signal indicative of the temperature measured at said first and second tips; supervising means for controlling said means for determining, for processing said digital signal and for generating a control signal therefrom which is independent of ambient temperature of the oil flow; and means for switching the pumping unit on or off, according to said control signal.

The present invention also provides a method for controlling a pumping unit of an oil well comprising the steps of: placing a housing provided with a first and a second tip in a flow of oil between the wellbore and the holding tanks; providing a heater in said first tip and providing means for determining the temperature in said first and said second tips; driving said heater with a constant power input for radiating a substantially constant heat; measuring the temperature at each of said first and second tips and generating a digital signal indicative of the temperature measured at said first and second tips; processing said digital signal and generating a control signal therefrom which is independent of ambient temperature of the oil flow; and switching the pumping unit on or off, according to said control signal.

Advantageously, the controller of the present invention detects the presence or absence of flow, based on standard principles of thermal capacity and dispersion. Actual temperature measurements are performed according to the present invention under microprocessor control which calculates temperature as a function of sampling frequency at each of the thermistors.

Still another advantage is that the controller has no moving parts with which the flow of oil is detected.

The decision to shut the pumping off or on is based on an average of temperatures, calculated over a selected number of last samples. The samples that are older than this number of samples are dropped from sampling information.

Finally, the capacity to remotely log the controller to a central processing unit is a benefit in areas where large distances separate the company from the oil well.

BRIEF DESCRIPTION OF THE DRAWINGS

In the following, the invention will be described in further detail with reference to the drawings, wherein.

DESCRIPTION OF THE PREFERRED EMBODIMENT

The oilwell control mechanism herein described is based upon thermal dispersion. The basic design considers the two steel-encased thermistors aligned in parallel and in close proximity. As oil emerges from the well-head it flows through a standard piping arrangement into which the instrument has been installed so that the oil passes over both thermistors on its way to separation or holding tanks. The first thermistor (or cool probe) measures the normal ambient temperature of oil as it emerges from the ground. The second thermistor (or warm probe) measures the same temperature while applying a constant quantity of heat to the surrounding volume. The higher the flow rate the more heat that is carried away by the fluid moving past the thermistor and, hence, the lower the temperature recorded along its tip. Conversely, the more moderate the flow, the less heat absorbed by the fluid, and so the higher the temperature that is recorded. By comparing the warm to the cool (or ambient) temperature of the oil, an accurate reading of the well's current oil flow rate properties can be obtained.

The equation for fluid flow between two points having a difference of temperature T has been established from the Newton Equation of cooling, Nusset Number (for forced external flow), Prandtl and Reynolds Numbers, after effecting simplifications and approximations:

$$U = 2.6 q^2 d A^{-2} T^{-2} a^2 \qquad (1)$$

where:

U is the velocity of fluid;
T is the temperature difference between the points under consideration;
q is the energy transfer index in the heated probe tip;
d is the diameter of the probe tip;
A is the area of the probe tip; and
a is a function of thermal conductivity, kinetic viscosity, specific heat and density of the fluid.

A and d are constant and the changes with temperature in a can be compensated for through software. The energy into a heated probe placed in the flowing fluid q, is squared in equation (1), so it is vital that the energy radiated by the probe is stable, independent of voltage and temperature effects. If q is kept constant, the equation (1) can be written:

$$U \alpha \frac{1}{\Delta T^2} \qquad (2)$$

To allow for other heat loss, as the losses down the probe tube, equation (2) becomes:

$$U = \frac{c}{\Delta T^2} - b \qquad (3)$$

where b and c are constants.

In conclusion, if the difference in temperature between two points in the flow is measured, the velocity of the flow can be determined, such a value being substantially independent of the temperature of the fluid. Additional compensation for the variation of constant fluid properties from well to well and with temperature can be dealt with by designing an appropriate optimizing software. The controller is housed in an instrument box attached to a stainless pipe fitting which will be described later in connection with FIG. 6. The housing has two protruding tips forming the two points of measurement. For measurement, the controller is placed in a flow of oil between the wellbore and the storing tanks.

Figure 5:
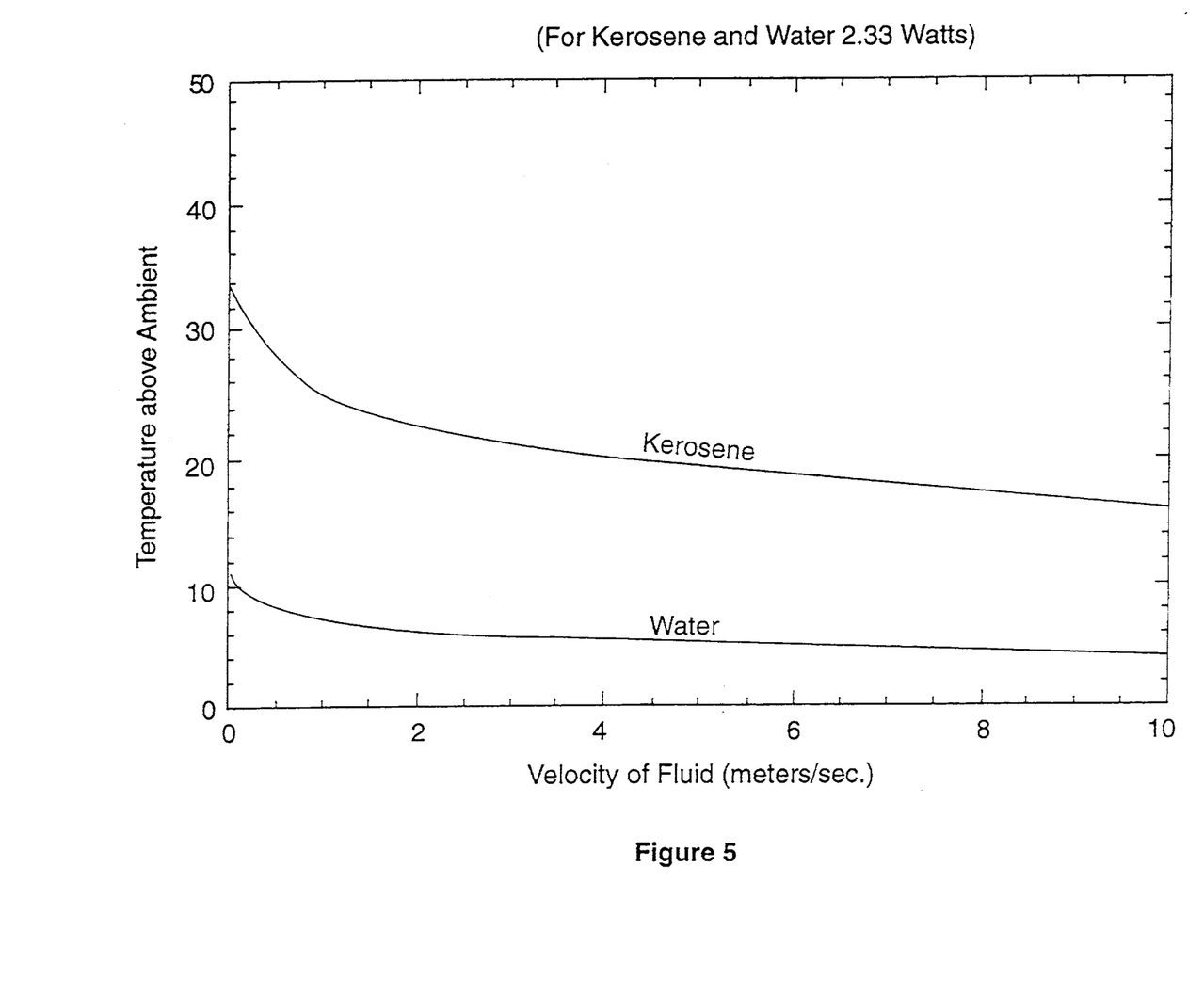
FIG. 5 shows a Temperature/Velocity characteristic for illustrating the principle of the present invention.

According to equation (1) above and as represented in FIG. 5, the velocity of the fluid is a function of the inverse of the square of the difference in temperatures between the two probes. Energy is generated in the heated probe tip at a constant rate. As the probe heats up, it will find an equilibrium with the environment, namely just as much energy goes into the probe as is taken away. If the fluid is moving, the environment removes energy more easy and the probe tip temperature will fall to a new equilibrium. The faster the fluid flows, the closer the heated probe temperature approaches the ambient temperature, measured by the unheated probe. Thus, if the difference in temperature between the probe tips is determined, a measurement independent of the ambient temperature of the oil is obtained.

Figure 3:
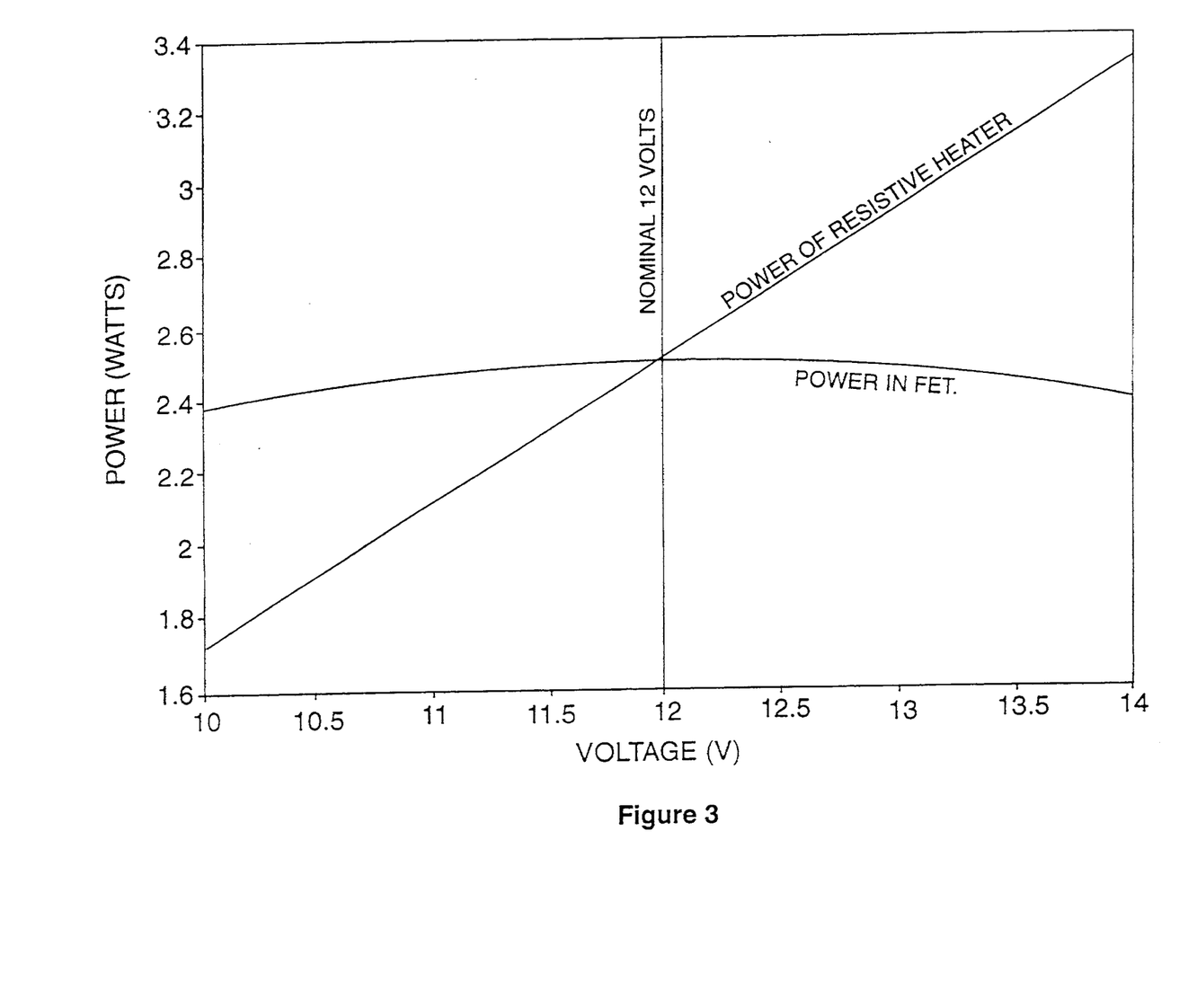
FIG. 3 shows a Power/Voltage diagram for the heater of the controller.

The calculated velocity of the fluid is proportional to the square of the energy transfer in the probe. Therefore, it is critical that the energy into the probe is stable over ambient conditions. The energy from a resistive probe changes as a square of the applied voltage, and resistance can also change with the temperature. A resistive heater was found to be unacceptable to this application so an active constant energy source is needed to remove this variable (FIG. 3). If the probe were temperature dependent, then the temperature fluctuations could not be easily correlated to actual change in the oil flow.

It is also important that the two tips have identical thermal mass so that the temperature of the two tips changes in the same way.

Figure 1:
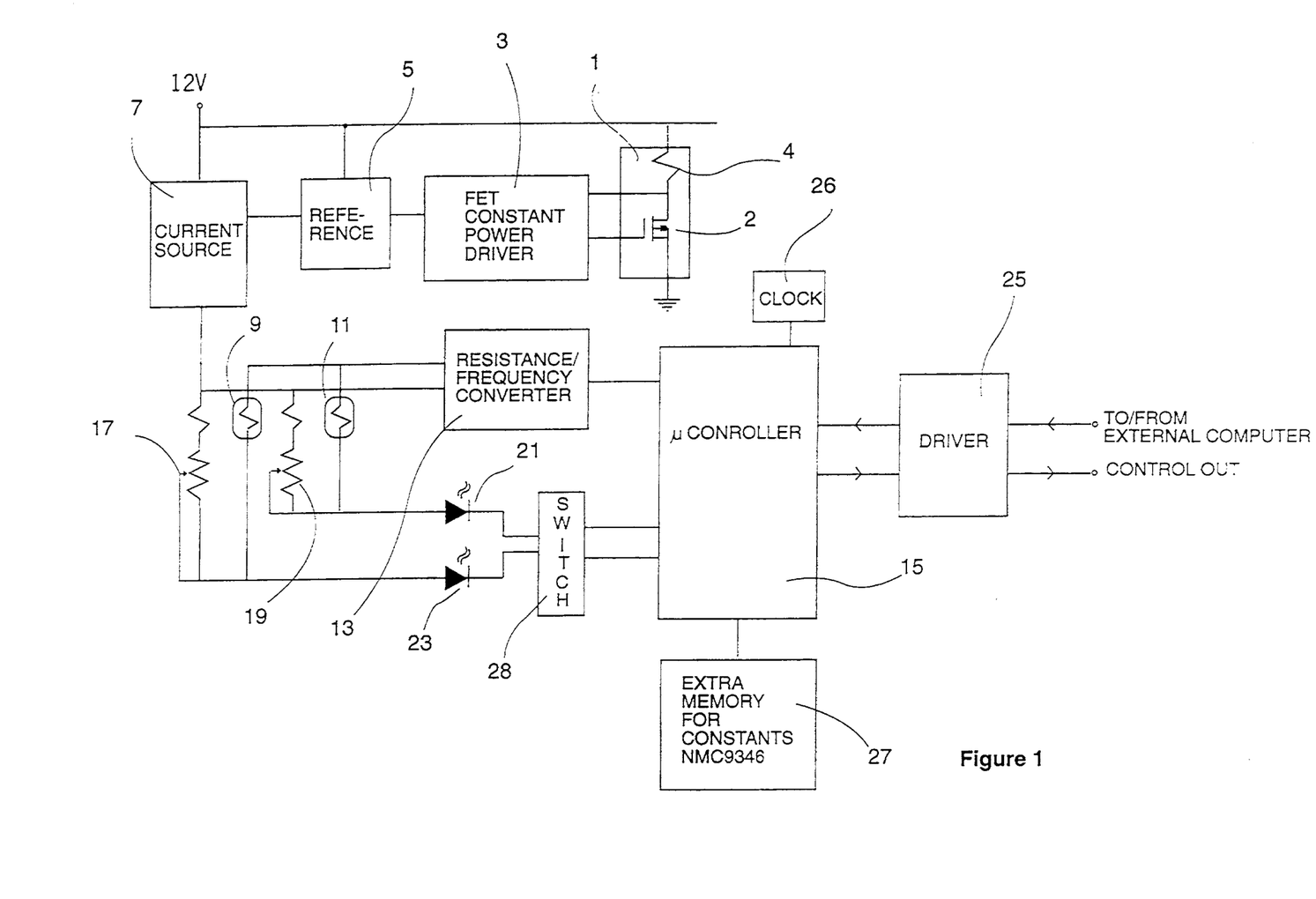
FIG. 1 illustrates a block diagram of the controller for controlling the pumping unit of an oil well of the present invention.

FIG. 1 shows a block diagram of the controller for controlling the pumping unit of an oil well of the present invention.

The solution proposed in the present invention for maintaining heat transfer index q constant (equation (1)), is to use a constant power heater 1 in one of the probe tips.

The constant power heater comprises a FET 2 connected in series with a resistor 4. The FET is driven with a constant power driver 3, in an arrangement that the voltage across resistor 4 is directly proportional with a reference voltage given by a reference voltage circuit 5. A current source 7 gives a constant current of approximately 1 mA to the driver 3. This current can be calibrated as described later.

A first thermistor 9 is arranged in close proximity to constant power heater 1 in the first tip of the probe, for measuring temperature T1 at the point of heat radiation. A second thermistor 11 is placed in the second tip of the probe, and measures ambient temperature T2. Thermistors have a non-linear, but well defined negative resistance. The voltages across thermistors 9 and 11 are applied to a resistance-to-frequency converter 13, where they are sampled and converted to a signal of frequency f1, respectively f2 as described later.

Thermistors 9 and 11 are alternatively connected to the resistance-to-frequency converter 13, such that a combined frequency signal is obtained at the input of a microcontroller 15. Microcontroller 15 gives a swapping signal to swapping circuit 28 for switching between thermistor 9 and 11.

A visual check for probes is also provided, for indicating when the respective thermistor is connected to the converter. In the preferred embodiment of the present invention, the visual check is effected with light emitting diodes 21 and 23, each connected in series with the respective thermistor. Since this pan of the circuit is dependent only on current, the characteristics of the LED's are not demanding.

Figure 4:
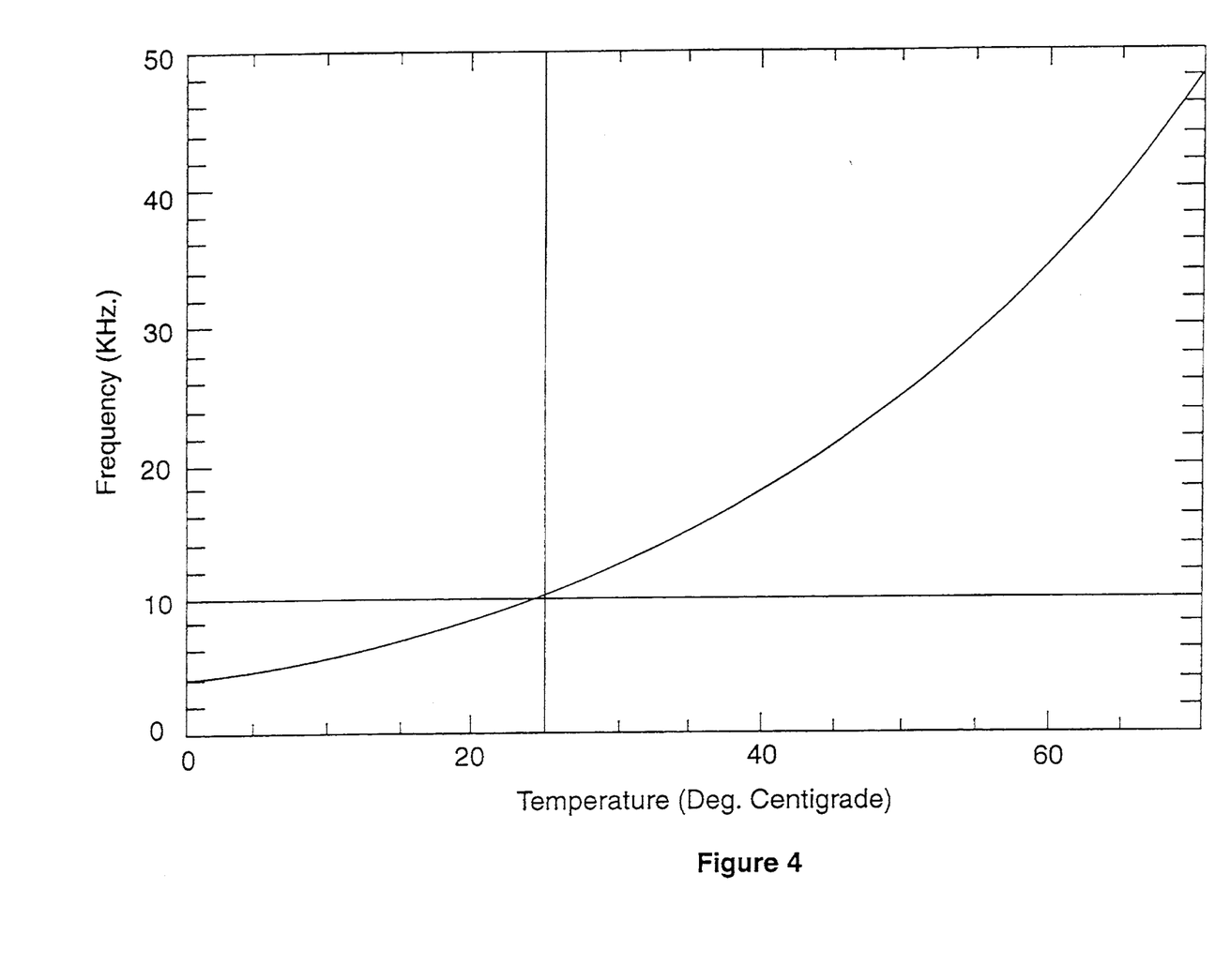
FIG. 4 illustrates a Frequency/Temperature diagram for calibration of the controller.

The microcontroller 15 has a look-up table to compute the temperature of the probe tip according to the input frequency. The Frequency/Temperature diagram for calibration of the controller is shown in FIG. 4. This method is used because the non-linear characteristics of the thermistors are hard to solve over a wide range of temperatures with the accuracy needed with the computing power available. For a given frequency into the look-up table, microcontroller 15 directly outputs a temperature with little calculation.

A clock 26 gives a clock signal to microcontroller 15.

An extra memory 27 is used to store constants employed in the controlling of the pump jack.

A driver 25 controls the well by turning the pump-jack motor on and off by use of a optically isolated solid state relay (not shown). The driver 25 may also be used to communicate with a remotely located computer over a RS232 interface. This external computer may be used to read the data such as probe temperature and also write new constants to the controller's extra memory.

Figure 2A:
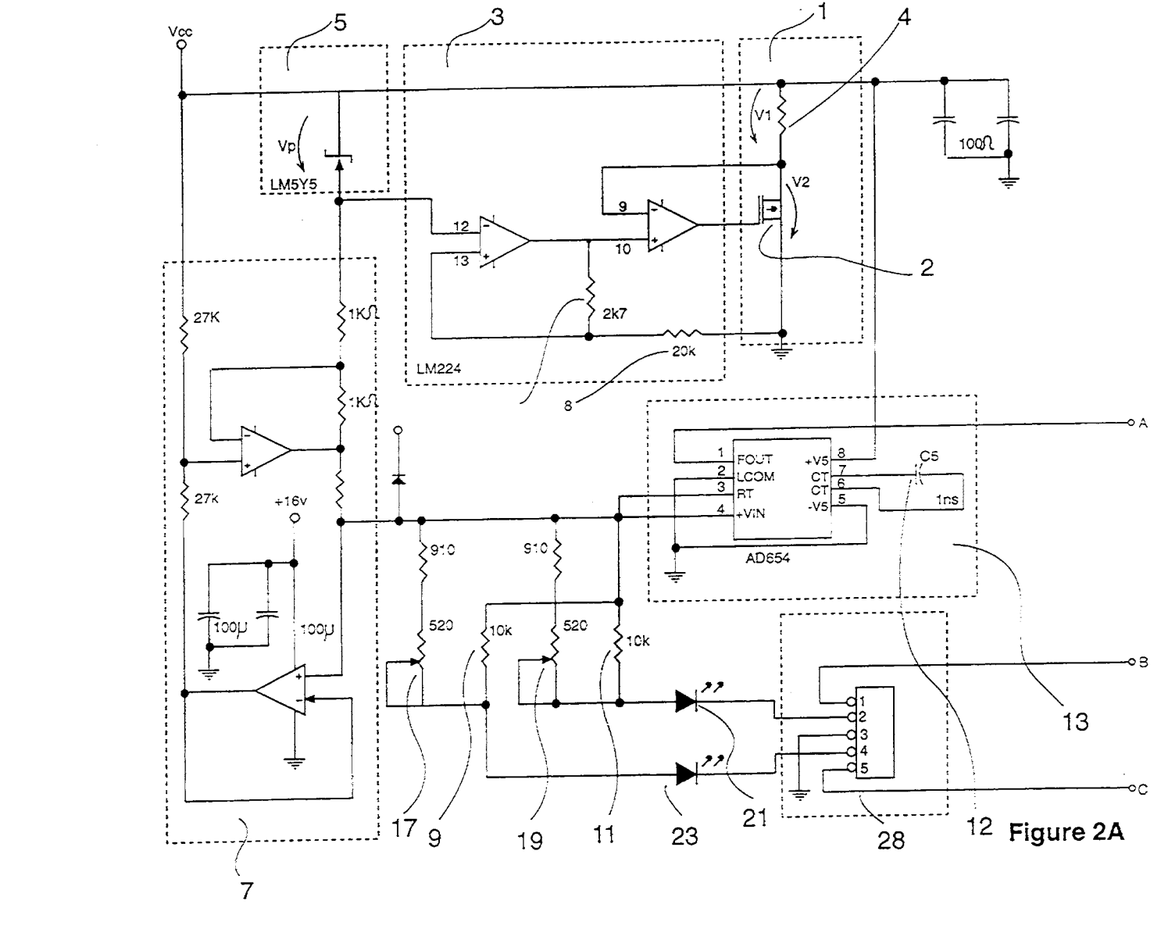
FIG. 2A illustrates the first part of a circuit diagram of the controller of FIG. 1.
Figure 2B:
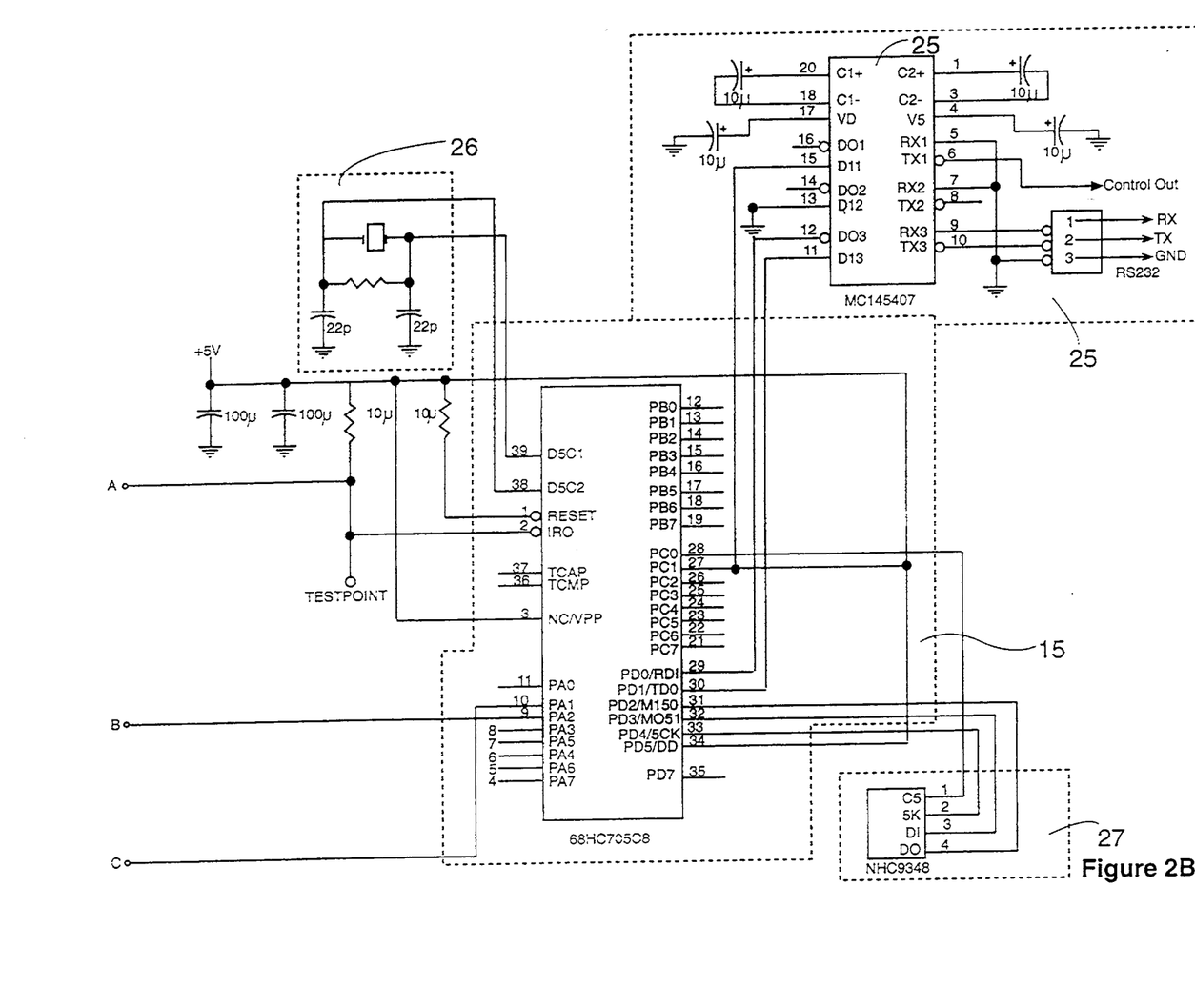
FIG. 2B illustrates the second part of the circuit diagram of the controller of FIG. 1.

FIGS. 2A and 2B illustrate the circuit diagram of the controller of the present invention.

Microcontroller 15 (see FIG. 2A) drives the switching between the thermistors 9 and 11, so that the voltage at the input of converter 13 alternately gives the measurements obtained with thermistors 9 and 11. The resistance-to-frequency converter 13 checks each thermistor 9 and 11 for one second and the resulting frequency is sent to the microprocessor 15, preferably a 68HC705C8. The output of the converter 13 is a signal composed of two frequencies f1 and f2, according to the voltage measured by the respective thermistor. This signal is input (on pin 2) to microcontroller 15.

An establish flow time, shut-in time, timing out period and low flow point constants are set in accordance with a well's parameters. An extra nonvolatile memory 27, preferably a NHC9345, is used to store system constants.

Microcontroller 15 checks the look-up table stored into its internal memory to determine a first and a second temperature corresponding to the input frequency and calculates the difference of these temperatures. This difference signal is processed and a rolling average signal is determined over time. The rolling average signal is compared with the low flow point for generating the control signal, when the rolling average signal is greater than the low flow point. The clock 26 is provided with a 4 MHz quartz.

Receiver-driver 25 is controlled by the output signal of microcontroller 15 available on pin 27. Unit 25, preferably an MC145407, issues a control signal which activates the relay which stops or starts the pumping operation. When the difference between the temperature measured by the thermistors surpasses the low flow point (for example 10° C.), the microcontroller interprets this difference as "no flow". The driver on the MC145407 turns the pump-jack motor on and off by use of a optically isolated solid state relay to disconnect the pump.

To communicate with the external computer 47 (see FIG. 9) and to control the well, the receiver driver 25 uses a RS232 serial port. The external computer 47 can read the data such as probe temperature and also write new constants to the controller.

The constant power driver circuit 3 will be disclosed in further detail with reference to FIGS. 2A and 4.

The power FET 2 is used as a constant energy source. The uniquely designed constant power driver 3 drives the FET gate so as to adjust the current in relation to the voltage across the FET to maintain a constant dissipation in the FET.

If the voltage $V_2$ across FET 4 is constant, the equations for the power in FET, the voltages $V_P$ given by reference 5 and $V_1$ across the resistive heater, solved for a peak power on the FET, give the relation $V_1=\frac{1}{2}V_P$. This comports that the voltage $V_1$ is constant, as the voltage $V_P$ on zener diode is constant.

An example of how to calculate the power dissipation follows:

$V_{cc}$=12.0 Volts applied voltage $V_P$=2.50 Volts precision voltage source

P=2.50 watts power dissipated in FET g is the ratio of feedback resistors 6 and 8.

R is the series resistor 4.

$g=V_P/(2*V_{cc}-2*Vp)=0.1315$

Using a resistor of 20 Kohm for 8 and a resistor of 2.7 Kohm for 6, the value for resistance 4 becomes:

$$R=V_P*(V_{cc}-V_P/2)/(2*P)=5.4 \text{ ohm}$$

The power dissipated by the FET is dependent on the applied voltage $V_{cc}$ (12 Volts) across the FET, the ratio g of the feedback resistors 6 and 8, the precision voltage source $V_P$ and the resistance of the series resistor 4. For a nominal value of supply voltage $V_{cc}$=12 V, $V_P$=2.5 V and for a resistor 4 of 5.4 ohm, the resulting power over the FET is 2.488 Watts at peak. The applied voltage Vcc is supplied by a LM7812 voltage regulator which is stable within 0.5% from −40 to +85.

The diagram shown in FIG. 3 illustrates the power in the resistor 4 and in FET 2 for different values of the supply voltage. FIG. 3 shows that large changes in Vcc have only a small effect on the power dissipation in a range between 10 and 14 Volts. Temperature will affect the two feedback resistors 6 and 8 equally so that the ratio g will remain constant.

The power output is independent of the characteristics of the FET. The driving circuit compensates the gate voltage for any change in the FET gain due to the temperature. The power in the FET is inversely proportional to the resistance of the series resistor 4 and is totally a function of this resistance. The power in the FET can be set by adjusting this resistance value. Resistor 4 is a power resistor rated at 3 watts to keep the thermal resistance changes to a minimum so it does not dissipate a lot of heat.

Preferably, the precision voltage reference is stable within 0.4% for variations of temperature from −40° C. to +85° C. The constant power driver circuit 3 is made of a part of a LM224, with the reference circuit 5, a zener diode LM385, connected between the negative input 12 of the differential amplifier of the constant power driver 3 and the supply voltage. At the output of the driver, the resistor 4 of the constant power heater 1 is connected between pin 9 and the supply voltage. The FET, which is preferably a p-type IRF95390, is connected between pins 9 and 8 of LM224. The other part of the LM224 is used for the current source 7.

In the circuit of the present invention, the thermistors are connected to the scale compensation input of converter 13. This gives the range of variation of the thermistors' resistance with temperature. The offset calibration is effected by varying resistors 17 and 19 connected to the input of converter 13.

In the preferred embodiment of the invention, frequency convertor 13 is an AD654 circuit, which presents a very high impedance (250 Mohms) to the input voltage applied on pin 4. This voltage is converted into the proper drive current by the thermistors 9 and 11 connected at pin 3. The resistance of the thermistors is selected to provide a 1 mA full scale current with enough trim range to accommodate the circuit output error of 10% and the components tolerances. With this value of the current a good linearity is obtained. A good voltage to frequency linearity also requires the use of a capacitor 12 with low dielectric absorption and a small temperature coefficient. Polystyrene, propylene or teflon capacitors are preferred and should be wired very close to the AD654. The output frequency is collected on pin 1 and applied to microcontroller 15. The output frequency depends on the input voltage and on the value of calibrating resistors 17 and 19.

FIG. 4 shows a Frequency to Temperature diagram for illustrating the calibration of the device of the present invention. It is apparent that the frequency of converter 13 varies with the temperature, namely it increases with the ambient temperature of the fluid. For compensating for these variations, the thermistors are manually turned on (for example shorted to ground) for calibration using resistors 17 and 19 (see FIG. 2A). To this end, the probe tips are immersed in a water bath at 25° C. with header 28 off and the frequency output of converter 13 set at 10 Khz.

FIG. 5 shows a temperature to velocity characteristic. It is apparent that the temperature of the fluid decreases with an increase in the velocity of the fluid, for both kerosene and water. The variations of the fluid characteristics with temperature are accounted for by adequate software.

Figures 6, 7:
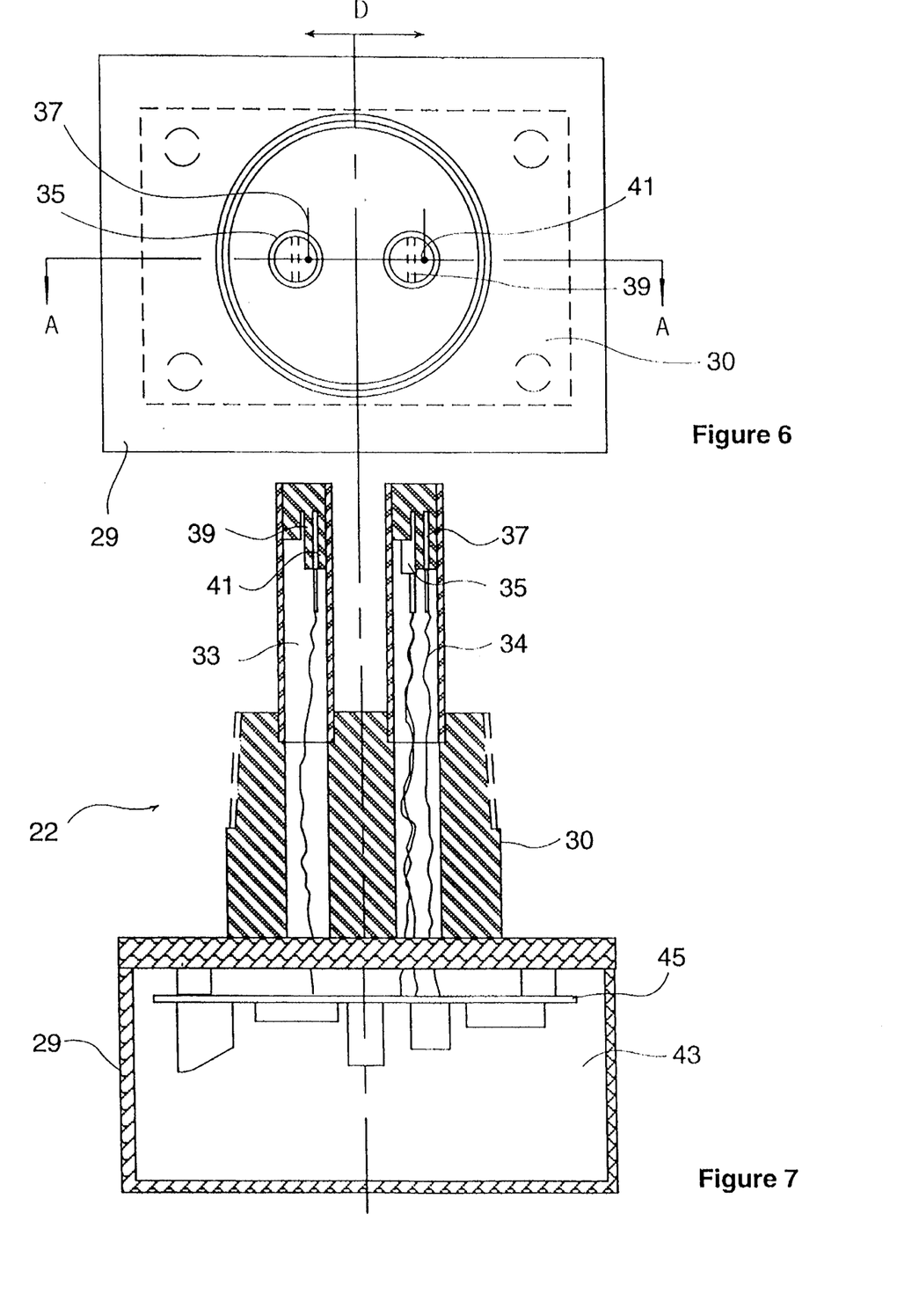
FIG. 6 shows a transversal cross-sectional view of a tip of the controller housing.
FIG. 7 illustrates a longitudinal sectional view of a tip of the housing.

FIGS. 6 and 7 illustrate the housing of the controller. The controller is housed in an instrument box 29. The following preferred dimensions of the housing 29 are given by way of example and the invention is not limited to a probe having the following particular size. The housing is attached to a 2 inch 11½ NPT stainless pipe fitting, as illustrated in FIGS. 6 and 7. This is screwed into a two-inch "T" fitting 28 in a pipe which connects the wellbore and the storing tanks. Two identical stainless steel tips 31 and 33 attached to the fitting, each 12.7 mm in diameter by 50 mm long and 25 mm apart, are placed in the fluid stream, orientation is not important. The tips are identically sized to have substantially the same thermal mass, in order to compensate for the changes in the ambient temperature.

A tip 31 or 33 is made of stainless steel tubing with a stainless steel plug. The tip 31 is machined with a slot 35 to mount the FET 2 and a hole 37 to mount the thermistor 9 and then is brazed into the end of the housing 29. The tip 33 has a slot 39 which is not used and a hole 41 for receiving thermistor 11. In this way, heater 1 heats the fluid in contact with tip 31, thermistor 9 measures the temperature of the fluid surrounding heater 1 and thermistor 11, measures the ambient temperature of the fluid at distance D from heater 1. Case 29 accommodates the electronics in compartment 43, and supports tips 31 and 33. The probe is cleaned and polished.

FIG. 7 illustrates a longitudinal section in the tip 31. The thermistor 9 and FET 2 are slid down the tube and glued into place with thermal glue. The assembly is attached to the main stainless fitting with commercial tube fitting.

Figure 8:
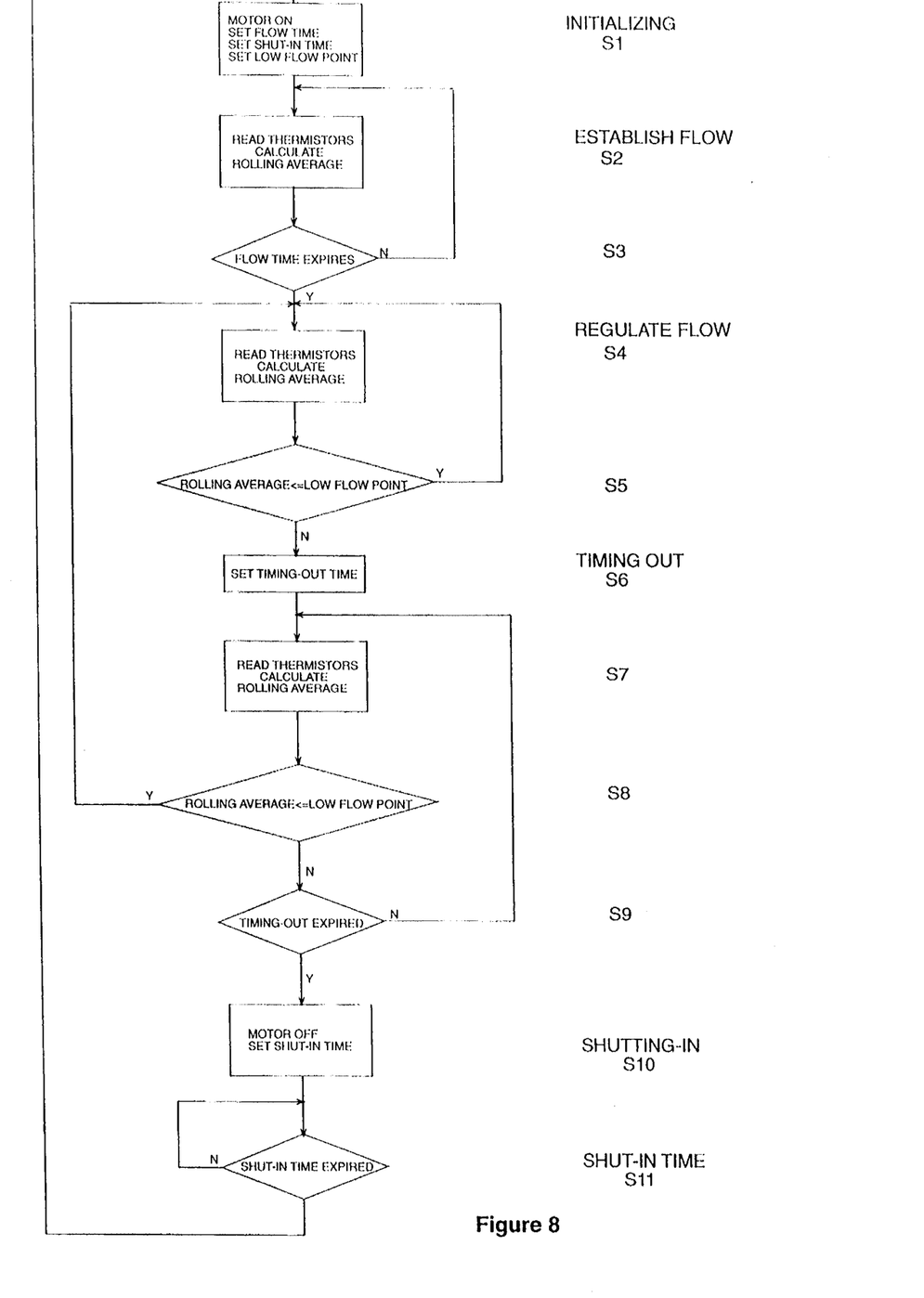
FIG. 8 is a flowchart illustrating the steps for controlling the pumping unit of an oil well according to the present invention.

The method for determining the presence of oil in the well and accordingly to start or stop the oil pumping operation will be described in the following with reference to the flowchart illustrated in FIG. 8.

Microcontroller 15 extracts a first and a second temperature data from the input digital signal received on terminal 2 and determines the difference of temperatures measured by the thermistors. This difference signal is processed and a rolling average is obtained therefrom. A rolling average is determined for the establish flow time (which is preset) and the rolling average signal is compared with the low flow point for generating the control signal when the total rolling average is greater than the low flow point.

In the first step S1, the controller is initialized, namely an establish flow time, a shut in time, a timing-out period and a low flow point constants are set and the pump is turned "on".

The length of the shut-in time for the pumping unit is initially preset according to known flow parameters of the respective wellbore, but can be subsequently adjusted to optimize for maximal flow.

During the next step S2, heater 1 heats the fluid in vicinity of thermostat 9, the temperature of the fluid at thermostats 9 and 11 is measured, and the velocity of the fluid is calculated in microcontroller 15 from the difference between the temperatures measured by thermostats 9 and 11. A rolling average over the establish flow time is calculated in the loop of step S2 and S3.

When the establish flow time has expired, the method of the invention provides for taking a next measurement and determining the rolling average over the latest selected number of samples during the flow time preset in step S1. In step S5 the rolling average is compared with the low flow point. If the rolling average is less than the low flow point, the pump continues to run, temperature is measured, etc.

In step S7, the rolling average is calculated by processing the next readings from the thermistors and is again compared with the low flow point in step S8. When the rolling average is less or equal with the low flow point, steps S4 to S8 are repeated and the timing out period is reset accordingly.

If the rolling average is above the low flow point in step S8, it is checked in step S9 if the timing out period has expired. If not, the process returns to step S7 for updating the rolling average for the unexpired timing out period. If the flow time has expired and the rolling average is above the low flow point, as shown in step S10, the pump is turned "off" and the "shut in" time begins. The expiration of the shut in period is monitored and when it expires, the system is initialized (S1).

When re-establishing flow, the system checks flow readings against flow reading obtained during previous iteration. For example, if fluid reading (velocity) is 10% lower than that for the previous iteration, then shut-in time for next "shut in" period is increased by 10%. Conversely, if fluid reading (velocity) is 10% higher than that for the previous iteration, then shut-in time for next "shut in" period is decreased by 10%. The decrease or increase of the "shut-in" time may vary according to well type and well maturity.

Figure 9:
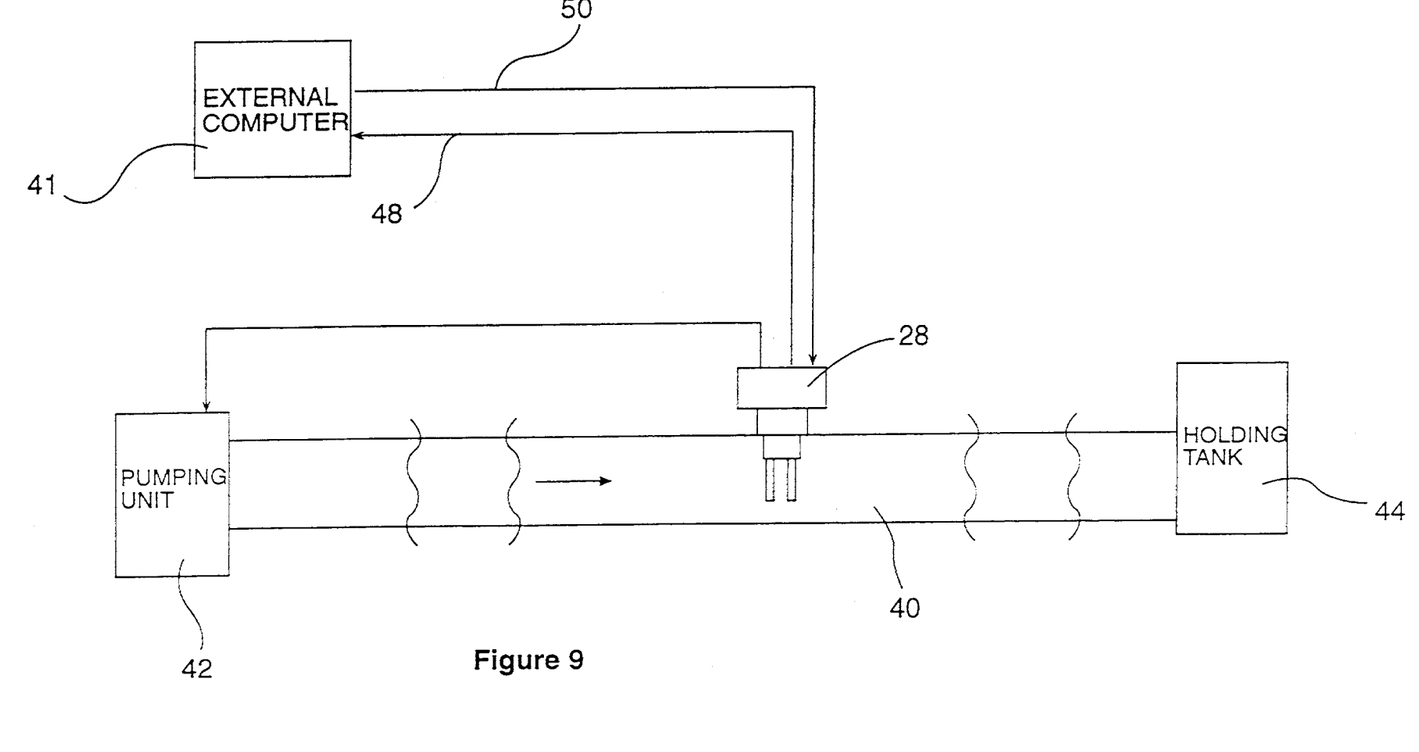
FIG. 9 illustrates a general view of the controller installed in an oil well.

FIG. 9 shows the controller 28 placed in an oil conduit 40 between the pumping unit 42 and holding tanks 41. When the controller 28 detects that the oil flow in conduit 40 is below the low flow point, a signal on conductor 46 stops the pumping unit 42. After a predetermined timing out period, and a shut-in period the pumping unit 42 is turned on for an established flow time, computer 47 receives information on the oil well characteristics on conductor 48 and returns to controller 28 updated constants. As the way, the established flow time, shut-in time, timing-out period and low flow point are updated in conformity with the current flow characteristics, the variations in oil production can be adjusted on a continuous basis.

The method of the present invention also comprises calibrating thermistors 9 and 11 for obtaining correspondence between the temperature measured and the power fed to the constant power heater 1. As well, the method provides for compensating for the temperature variation with oil velocity and an additional compensation for the variation of the frequency of the digital signal with temperature.

While this invention has been shown in the embodiment depicted in FIGS. 1 to 9, it should be apparent to those skilled in the art that it is not so limited, but is susceptible to various changes without departing from the scope of the invention as defined by the appended claims.

The embodiments of the invention in which an exclusive right or privilege is claimed are defined as follows:

1. A controller for controlling a pumping unit of an oil well which is used for pumping oil from a wellbore to holding tanks, comprising:

a housing having a first tip and a second tip for placement in a flow of oil between the wellbore and the holding tank;

means for generating a substantially constant power;

a heater in said first tip for receiving the constant power generated by said means for generating and for radiating a substantially constant heat;

means for determining the temperature at each of said first and second tips and for generating a digital signal indicative of the temperature measured at each said first and second tips;

supervising means for controlling said means for determining, for processing said digital signal and for generating a control signal which is independent of ambient temperature of the oil flow; and means for switching the pumping unit on or off, responsive to said control signal.

2. A controller as claimed in claim 1, further comprising means for calibrating said means for determining, for obtaining a correspondence between the temperature measured by said means for determining and the power supplied to said heater.

3. A controller as claimed in claim 1 wherein said heater comprises a FET connected in series with a resistor.

4. A controller as claimed in claim 3, wherein said means for generating a constant power comprises:

a constant power driver circuit for setting the power dissipated by said FET and maintaining this power substantially constant so as to obtain a generally linear dissipated power/voltage transfer function for said resistor;

a constant current source for generating a driving current for said constant power driver circuit; and a reference circuit means for maintaining said driving current substantially independent of the fluctuations of the supply voltage.

5. A controller as claimed in claim 1, wherein said means for determining comprises:

a first and a second thermistors, each arranged in a respective tip, for measuring the ambient temperature of said respective tip and for generating a first and second voltages;

a convertor for transforming said first and second voltages into said digital signal; and swapping means for sequentially connecting said thermistors to said converter for alternatively communicating said first and said second voltages.

6. A controller as claimed in claim 5, wherein said means for determining further comprises a visual check means for indicating which of said first and said second thermistors are connected to said convertor.

7. A controller as claimed in claim 6, wherein said visual check means includes a first LED connected in series with said first thermistor and a second LED connected in series with said second thermistor.

8. A controller as claimed in claim 5, wherein said swapping means comprises a switching circuit with a frequency of 1 Hz.

9. A controller as claimed in claim 1, wherein said supervising means comprises:

means for storing an establish flow time, a shut-in time, a timing-out period and a low flow point;

means for extracting a first and a second temperature data from said digital signal;

means for processing said first and said second temperature data and determining a rolling average for said flow time;

means for comparing said rolling average with said low flow point and for updating the timing-out period if said rolling average is greater than said low-flow point;

means for generating said control signal such as to turn off said pumping unit when said timing-out period has expired and to turn on said pumping unit when said shut-in time has expired; and means for controlling said means for determining and said heater.

10. A controller as claimed in claim 9, further comprising means for compensating for the temperature variation with oil velocity.

11. A controller as claimed in claim 9, further comprising additional means for compensating for temperature variation with velocity of the oil flow.

12. A controller as claimed in claim 10, further comprising supplementary means for compensating for the temperature variation with the frequency of said digital signal.

13. A controller as claimed in claim 1, wherein said means for switching the pumping unit comprises a solid-state relay driven by said control signal.

14. A controller as claimed in claim 1, wherein each of said tips has a generally cylindrical shape of a diameter selected to house said FET and said first or said second thermistor and to leave a distance between said first and said second tips.

15. A controller as claimed in claim 1, wherein said first and said second tips are substantially similarly sized to obtain a significantly equal thermal mass therefor.

16. A controller as claimed in claim 1, wherein said housing comprises a compartment for protecting said means for generating and said supervising means, said compartment communicating with said first and said second tips for electrical connection.

17. A controller as claimed in claim 16, wherein the shape of said compartment is generally cylindrical, with said first and second tips protruding at a first base end thereof.

18. A controller as claimed in claim 9, further comprising means for communicating to a remote computer said digital signal indicative of the temperature measured at said first and said second tips and for receiving from said computer updated values for at least one of said establish flow time, shut-in time, timing-out period and low flow point.

19. A controller for controlling a pumping unit of an oil well which is used for pumping oil from a wellbore to holding tanks, comprising:

a housing having a first tip and a second tip for placement in a flow of oil between the wellbore and the holding tank;

means for generating a substantially constant power;

a heater in said first tip for receiving the constant power generated by said means for generating and for radiating a substantially constant heat;

means for determining the temperature at each of said first and second tips and for generating a digital signal indicative of the temperature measured at each said first and second tips;

supervising means for controlling said means for determining, for processing said digital signal and for generating a control signal which is independent of ambient temperature of the oil flow;

means for switching the pumping unit on or off, responsive to said control signal;

means for calibrating said means for determining, for obtaining a correspondence between the temperature measured by said means for determining and the power supplied to said heater; and means for compensating for the temperature variation with oil velocity.

20. A controller for controlling a pumping unit of an oil well which is used for pumping oil from a wellbore to holding tanks, comprising:

a housing having a first tip and a second tips for placement in a flow of oil between the wellbore and the holding tank;

means for generating a substantially constant power;

a FET connected in series with a resistor placed in said first tip for receiving the constant power generated by said means for generating and for radiating a substantially constant heat;

means for determining the temperature at each of said first and second tips and for generating a digital signal indicative of the temperature measured at each said first and second tips;

supervising means for controlling said means for determining, for processing said digital signal and for generating a control signal which is independent of ambient temperature of the oil flow; and means for switching the pumping unit on or off, responsive to said control signal.

21. A controller for controlling a pumping unit of an oil well which is used for pumping oil from a wellbore to holding tanks, comprising:

a housing having a first tip and a second tips for placement in a flow of oil between the wellbore and the holding tank;

a FET connected in series with a resistor;

a constant power driver circuit for setting the power dissipated by said FET and maintaining this power substantially constant so as to obtain a generally linear dissipated power/voltage transfer function for said resistor;

a constant current source for generating a driving current for said constant power driver circuit;

a reference circuit means for maintaining said driving current substantially independent of the fluctuations of the supply voltage;

a first and a second thermistors, each arranged in a respective tip, for measuring the ambient temperature of said respective tip and for generating a first and second voltages;

a convertor for transforming said first and second voltages into a digital signal;

swapping means for sequentially connecting said thermistors to said converter for alternatively communicating said first and said second voltages to said converter;

supervising means for controlling said convertor, for processing said digital signal and for generating a control signal which is independent of ambient temperature of the oil flow; and a solid-state relay driven by said control signal to turn off or on said pumping unit.

22. A method for controlling a pumping unit of an oil well comprising the steps of:

placing a housing provided with a first and a second tips in a flow of oil between the wellbore to the holding tanks;

providing a heater in said first tip and providing means for determining the temperature in said first and said second tips;

driving said heater with a constant power input for radiating a substantially constant heat;

measuring the temperature at each of said first and second tips and generating a digital signal indicative of the temperature measured at said first and second tips;

processing said digital signal and generating a control signal therefrom which is independent of ambient temperature of the oil flow; and switching the pumping unit on or off, according to said control signal.

23. A method as claimed in claim 22, further comprising the step of calibrating said means for determining, for obtaining a correspondence between the temperature measured by said means for determining and the power fed to said heater.

24. A method as claimed in claim 22, wherein said step for driving with a constant power comprises the sub-steps of:

connecting a FET in series with a power resistor;

maintaining the power dissipated by said FET substantially constant for obtaining a substantially linear dissipated power/voltage transfer function for said resistor;

generating a driving current for said FET with a constant current source means; and maintaining said driving current substantially independent from variations of the supply voltage fluctuation.

25. A method as claimed in claim 22, wherein said step of measuring comprises the sub-steps of:

measuring the temperature at said tips and generating a first and a second voltages, respectively;

converting said first and said second voltages into said digital signal with a convertor; and successively connecting said means for determining for alternatively communicating to said converter said first and said second voltages.

26. A method as claimed in claim 22, wherein said step of generating a control signal comprises the sub-steps of:

storing an establish flow time, a shut-in time, a timing-out period and a low flow point;

extracting a first and a second temperature data from said digital signal;

processing said first and a second temperature data and determining a rolling average for said flow time;

comparing said rolling average with said low flow point and modifying the timing-out period if said rolling average is greater than said low-flow point;

generating said control signal for turning off said pumping unit when said timing-out period has expired and for turning on said pumping unit when said shut-in time has expired; and controlling said means for determining and said heater.

27. A method as claimed in claim 23, further comprising calibrating said means for determining, for obtaining correspondence between the temperature measured by said means for determining and the power fed to said heater.

28. A method as claimed in claim 24, further comprising the step of compensating for the temperature variation with oil velocity.

29. A method as claimed in claim 22, further comprising the step of compensating for the variations of the frequency of said digital signal with temperature.

* * * * *